United States Patent
Troppmann et al.

(10) Patent No.: US 8,738,969 B2
(45) Date of Patent: May 27, 2014

(54) SEMICONDUCTOR DEVICE AND METHOD FOR TRACING A MEMORY OF A SEMICONDUCTOR DEVICE

(75) Inventors: Rainer Troppmann, Kranzberg (DE); Frank Noha, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 286 days.

(21) Appl. No.: 13/366,965

(22) Filed: Feb. 6, 2012

(65) Prior Publication Data
US 2013/0024733 A1 Jan. 24, 2013

(30) Foreign Application Priority Data
Jul. 19, 2011 (DE) .......................... 10 2011 107 936

(51) Int. Cl.
*G06F 11/00* (2006.01)
(52) U.S. Cl.
USPC ........................................................... 714/45
(58) Field of Classification Search
CPC .................................................... G06F 11/348
USPC ............................. 714/45, 46, 47.1, 723, 733
See application file for complete search history.

(56) References Cited

U.S. PATENT DOCUMENTS

| | | | | |
|---|---|---|---|---|
| 7,168,010 B2 * | 1/2007 | Yadavalli et al. | ................ | 714/42 |
| 7,702,964 B2 * | 4/2010 | John | ................ | 714/45 |
| 8,397,133 B2 * | 3/2013 | Clark et al. | ................ | 714/766 |
| 2006/0277435 A1 * | 12/2006 | Pedersen et al. | ................ | 714/30 |
| 2008/0195793 A1 * | 8/2008 | Noha et al. | ................ | 710/313 |

* cited by examiner

*Primary Examiner* — Dieu-Minh Le
(74) *Attorney, Agent, or Firm* — John R. Pessetto; Wade J. Brady, III; Frederick J. Telecky, Jr.

(57) ABSTRACT

An embodiment of the invention provides a memory on a semiconductor device that has a plurality of memory areas where each memory area has a plurality of consecutive bits. Further, the semiconductor device includes a tag memory having a plurality of trace tags, each trace tag including at least one bit. Each memory area of the memory is mapped to a trace tag that indicates whether the respective memory area is selected for tracing or not. Each memory area and the assigned trace tag are read out and address of the memory area is forwarded to a trace module when an assigned trace tag indicates that the memory area is selected for tracing. When the assigned trace tag indicates that the memory area is not selected for tracing, data and address is discarded.

3 Claims, 3 Drawing Sheets

SEMICONDUCTOR DEVICE AND METHOD FOR TRACING A MEMORY OF A SEMICONDUCTOR DEVICE

CROSS-REFERENCE TO RELATED APPLICATION

This patent application claims priority from German Patent Application No. 10 2011 107 936.3, filed Jul. 19, 2011, which is incorporated herein by reference in its entirety.

BACKGROUND

Due to the complex architecture of modern semiconductor devices such as microcontrollers that may consist of multiple system masters accessing a plurality of different memories in parallel and at high speed, tracing of the memory of the semiconductor device may be problematic when performing a real-time memory and peripheral trace. Especially if large areas of the memory of the semiconductor device are selected for tracing, there is a high amount of trace data. Typically, trace data is stored in a trace buffer of an internal or external trace module. It is afterwards transferred from the trace buffer via a trace port. The bandwidth of the trace port interface may be a limiting factor especially for the trace performance in real-time environments. Accordingly, it is necessary to reduce the amount of trace data. This data reduction is typically performed by pre-filtering the trace data. Based on the application needs, the amount of trace data that is to be stored in the trace buffer and that is to be transferred over the trace port interface is reduced. This pre-filtering step may avoid losses of trace data if the amount of unfiltered data is higher than the data transfer speed of the available trace port. The trace data transfer has to be completed in an available time window that is reserved for this transfer.

According to the prior art, trace data filtering is mainly performed by defining one or more trace windows for an address range of the memory. However, due to space and gate count constraints and system performance degradation that is accompanying the tracing process, this trace data filtering concept is very limited. Especially if the data that is to be traced is spread over a large address base, a very coarse granularity for the address ranges is possible, i.e. needed. This will increase the amount of trace data and lead to the already mentioned technical problems.

SUMMARY

According to an aspect of the invention a method for tracing a memory of a semiconductor device is provided. The memory may be an internal or external memory that is typically (but not necessarily) accessible by a central processing unit (CPU) of the semiconductor device that may be a microcontroller or any other integrated circuit. The memory has a plurality of memory areas wherein each memory area comprises a plurality of n bits. These n bits can be consecutive bits. Memory areas may be standard memory blocks according to the system architecture of the semiconductor device. The memory may then be organized in blocks of n bits (for example 256 bits). An access (read or write operation) may then be performed for an entire block of n bits. The trace operation may then also be performed for an entire block of n bits. Each of the memory areas of the memory may then be mapped to a trace tag, wherein this trace tag indicates whether the respective memory area is selected for tracing or not. Accordingly, the data that is written to the memory area or read out from the memory area may either be captured or stored or passed through a specific interface (if selected for tracing) or discarded.

The semiconductor device may further comprise a tag memory comprising a plurality of trace tags wherein each trace tag comprises at least 1 bit. According to an aspect of the invention, the trace tag of the tag memory is a one bit field wherein preferably a logical "1" indicates that the respective memory area is selected for tracing and a logical "0" indicates that the assigned memory area is not selected for tracing.

In an embodiment, a trace tag may also comprise multiple bits (m bits). This can be advantageous for error coding. Instead of a single bit a plurality of bits may then be used for the trace tag. If the plurality of bits is four, a Single Error Correction Double Error Detection (SECDEC) scheme can be applied.

Further, the tag memory may be an internal or an external memory of the semiconductor device.

In an embodiment, the cache line of the semiconductor device may be organized in 256 bits=4×32 bits words. The memory area may then be a 256 bits block.

If a respective memory area of the memory is accessed (written or read), the assigned trace tag may also be read (for example in the same clock cycle). If the assigned trace tag indicates that the memory area is selected for tracing, the data of the memory area is provided e.g. to a trace module or via an I/O or bus system to further tracing equipment which may be internal or external to the semiconductor device. If the assigned trace tag of the memory area indicates that the respective memory area is not selected for tracing, data of the memory area is discarded.

The method according to aspects of the invention allows mapping a trace memory to the address space of the microcontroller. Specific data in the memory of the semiconductor device may be selected for tracing. Even for data that is spread over a wide range of the memory, the necessity for tracing large address ranges may be overcome. The tracing configuration may typically be defined by a system master like the CPU. However, it may also be configured from outside the semiconductor device, e.g. via a JTAG debug interface of a microcontroller. The method according to aspects of the invention allows accessing the memory of a semiconductor device in accordance with the system architecture. Advantageously, a fine granularity of data filtering may be provided. The trace access efficiency may be increased because a high number of data traces may be configured and these may spread over the whole memory content. Due to the fine granularity of the filtering process this may be done at much lower cost compared to known tracing methods that apply trace window based filtering.

According to other aspects of the invention, accessing and capturing or discarding data for tracing can be organized in a specific manner in order achieve high data throughput. Accordingly, the accessing (reading and/or writing) of a respective memory area of the memory and the reading of the assigned trace tag of the tag memory is performed within the same system clock cycle.

Furthermore, it is advantageous, if the step of providing or discarding of data of the respective memory area having a trace tag indicating that the assigned memory area is selected or not selected for tracing is also performed within a second single system clock cycle. This second system clock cycle is preferably subsequent to the first system clock cycle that comprises the step of accessing (reading or writing of) the memory area and reading the assigned trace tag. Advantageously, the second system clock cycle comprises the step of accessing a (subsequent) memory area and reading the assigned trace tag. In other words, a subsequent memory area and the assigned trace tag may be read or written within the same system clock cycle that is used for capturing or discarding trace data of a previous clock cycle.

The method according to aspects of the invention adds a latency or delay of one system clock cycle only. This additional clock cycle is only required in the initial access. Subsequent accesses only consume one cycle due to the pipeline nature of the implementation as described herein above. This leads to a high tracing performance. The method according to aspects of the invention may be regarded as to be a pipelined trace memory based filtering method and has a very low latency in the transfer of the traced data. Advantageously, this method is not constrained to high speed memories where e.g. the read and compare steps may be performed during the same system clock cycle. The advantageous method according to aspects of the invention is not limited to a two stage process.

According to another aspect of the invention, a semiconductor device, e.g. a microcontroller or any other integrated circuit comprising a memory, e.g. an external or internal memory that is typically accessible by a CPU, is provided. The memory has a plurality of memory areas that may be data blocks of n bits according to the system architecture (for example 256 bit blocks). The semiconductor device may further comprise a tag memory having a plurality of trace tags wherein each trace tag comprises at least a single bit. Each memory area is assigned to a trace tag that indicates whether the respective memory area is selected for tracing or not. The semiconductor device according to aspects of the invention may further comprise a trace module for receiving data of memory areas that are selected for tracing.

Advantageously, the semiconductor device according to aspects of the invention allows an implementation of the method for operating the same according to the above mentioned aspects of the invention. The standard trace module may be maintained, however, its typical window filtering operability is advantageously removed.

According to another advantageous aspect of the invention, there is a first register of the semiconductor device and this register is configured for temporarily storing an address (e.g. a binary or hexadecimal memory address) of a selected memory area. Further, a second register may be provided. This register is advantageously configured for temporarily storing data of the selected memory area. Additionally, a third register may be provided that may be further configured for temporarily storing data of the trace tag that is assigned to the selected memory area. In another advantageous aspect of the invention, the semiconductor device may be configured to forward the address from the first register to the trace module. Further, data from the second register may be forwarded to the trace module if the trace tag (that is stored in the third register) indicates that the respective memory area is selected for tracing. Following the above mentioned implementation, the cycles may be system clock cycles, access cycles or any other available and suitable clock cycle of the semiconductor device. Depending on the type of signal, the respective clock signals may be used to trigger the registers for the address data and trace tag.

According to another aspect of the invention, the semiconductor device may further comprise a first and a second multiplexer. The first multiplexer may be configured to receive the address from the first register and the second multiplexer may be configured to receive data from the second register. The semiconductor device may be further configured to forward the address from the first multiplexer to the trace module and to forward data from the second multiplexer to the trace module. If the trace tag in the third register indicates that the respective memory area is selected for tracing, the forward steps are performed. On the other hand, the semiconductor device may be further configured to discard the address and to discard data if the trace tag in the third register indicates that the respective memory area is not selected for tracing. This configuration of the semiconductor device allows implementing a single clock cycle operating method. The first register and the second register comprise the address and data from a first clock cycle. The trace tag in the third register indicates whether to capture or to discard data and address. Advantageously, memories of semiconductor devices having a high storage capacity may be traced with fine granularity.

BRIEF DESCRIPTION OF DRAWINGS

Further objects of the invention will ensue from the following description of example embodiments of the invention with reference to the accompanying drawings, wherein FIG. 1 schematically illustrates a mapping between a memory and a trace memory.

DETAILED DESCRIPTION OF AN EXAMPLE EMBODIMENT

Figure 1:
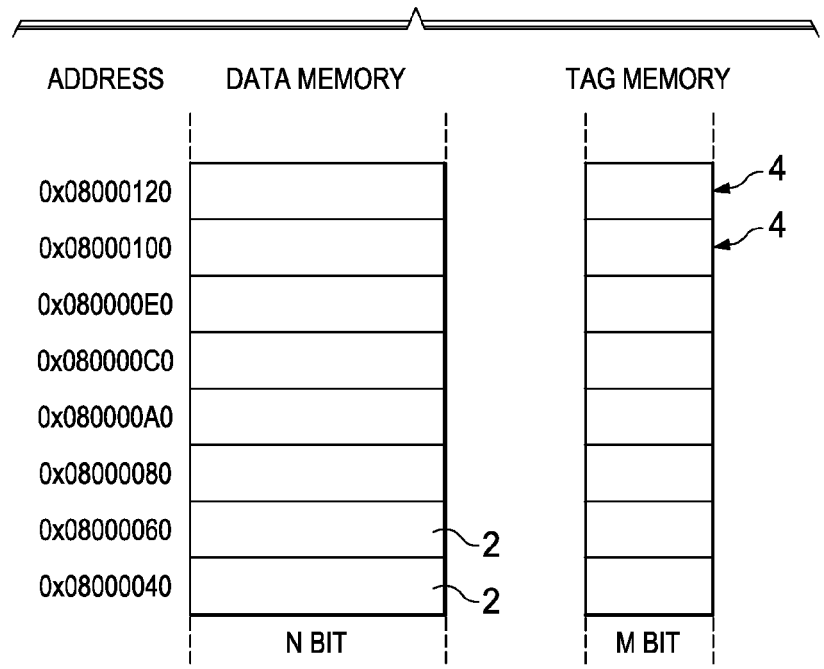

FIG. 1 illustrates a section of a data memory and a tag memory according to an embodiment of the invention. The data memory has a plurality of memory areas 2, each having a data memory width of n bits. The data memory width can be 256 bits. The respective hexadecimal memory address is denoted for each of the memory areas 2 in the field "address". A trace tag 4 of a tag memory is assigned to each memory area 2. In this embodiment, the trace tag 4 comprises m bits. In an embodiment, m may be 1. In another embodiment, m may be 4. Using four bits allows error correction of a single bit error. Regardless of the number of bits used for the trace tag, the information indicated by the tag is either that the respective memory area to which the tag is assigned, should be traced (i.e. captured) or should not be traced (i.e. discarded).

If the trace tag value is "0", the assigned memory area 2 is not selected for tracing (trace disabled). If the trace tag value is "1", the assigned memory area 2 is selected for tracing (trace enabled).

Figure 2:
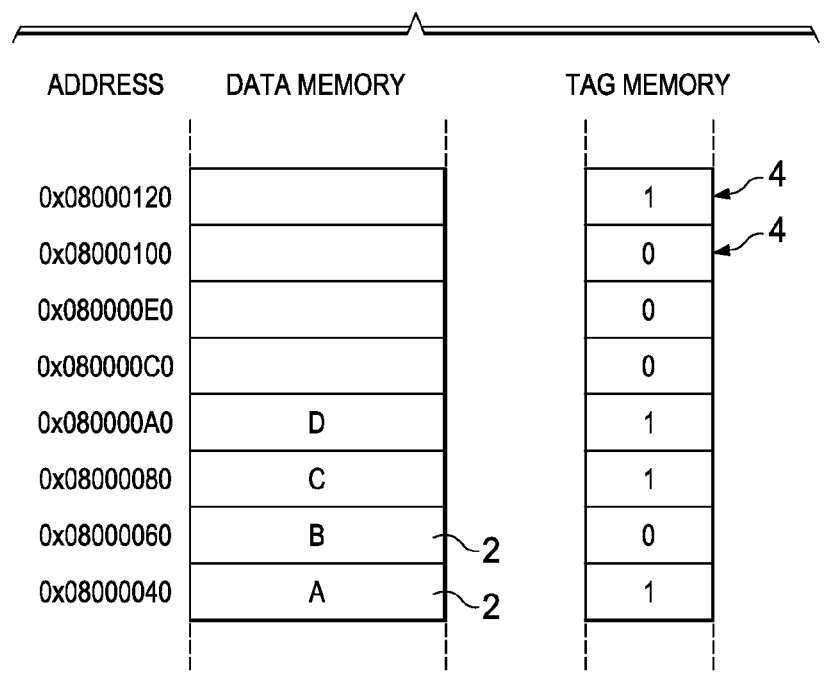
FIG. 2 illustrates a single clock cycle read out of a memory and a trace memory.
Figure 3:
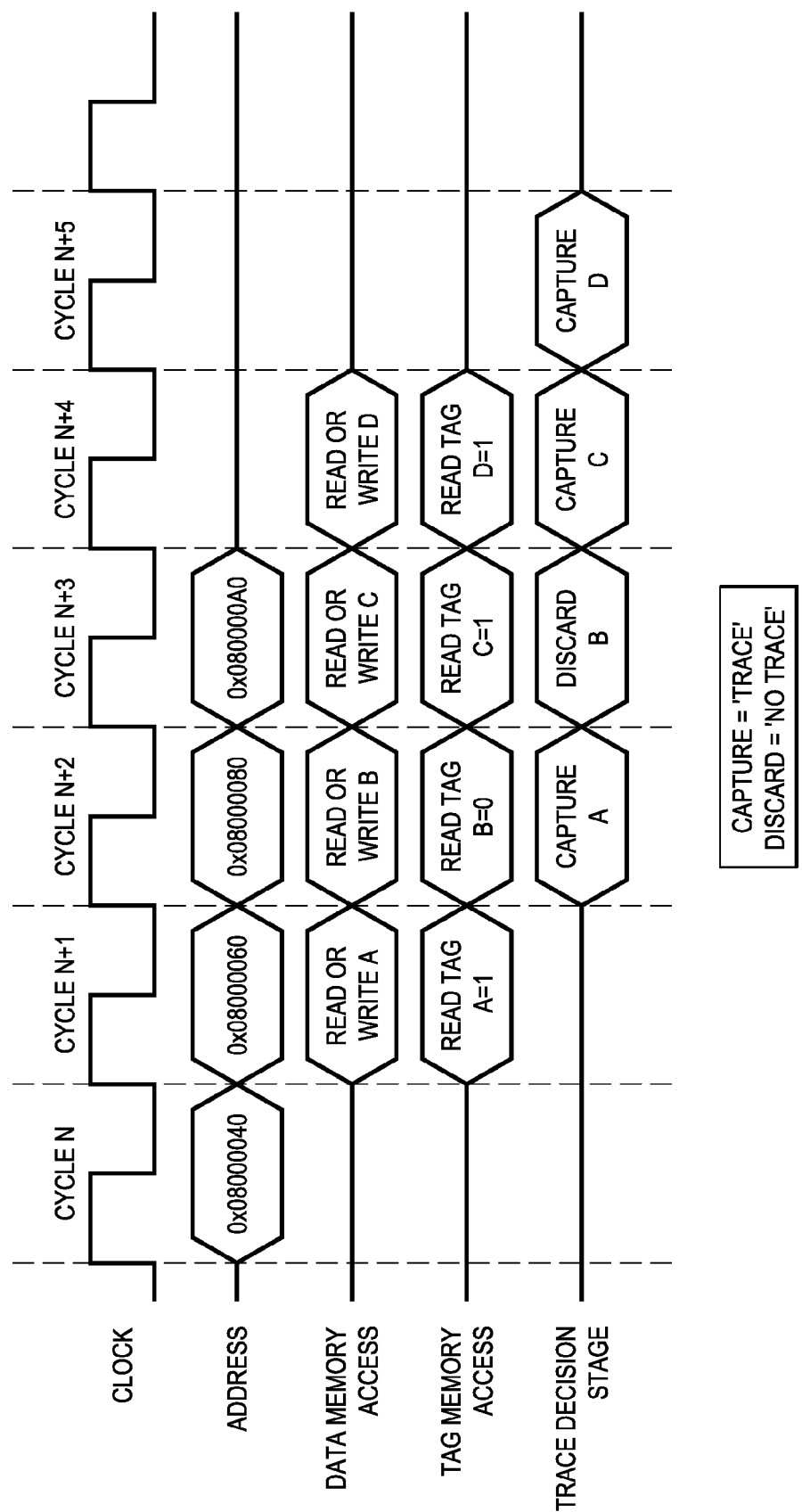
FIG. 3 is a table illustrating the single clock cycle read out process for specific exemplary clock cycles and FIG. 4 is a system block diagram illustrating an implementation of the memory, trace memory and trace module in a semiconductor device, according to a embodiment of the invention.

FIG. 2 shows a section of a memory and FIG. 3 shows a timing diagram of an access to the memory shown in FIG. 2 according to an embodiment of the invention.

In a first cycle n that may be a system clock cycle, an access cycle or any other suitable clock cycle that is available in a semiconductor device like e.g. a microcontroller, the memory address 0x08000040 of data of a first memory area (represented by "A") is provided at an address bus.

In a second (subsequent) clock cycle n+1, memory area "A" is accessed. An access can be a read or write operation of memory area "A". In the same clock cycle (second clock cycle n+1) in which memory area "A" is accessed, the trace tag 4 being assigned to memory area "A" is read. The value of this trace tag is "1". Also in the second clock cycle n+1, address 0x08000060 for memory block "B" is applied.

In a (subsequent) third clock cycle n+2, the memory area 2 having the address 0x08000060 comprising data "B" is accessed (read or written) and the assigned trace tag 4 comprising the trace tag value "0" is read out. As further operation during the third clock cycle n+2, the data "A" of the memory area 2 having the address 0X08000040 is captured as the trace tag 4 assigned to "A" has a bit value of "1" indicating that the respective memory area 2 is selected for tracing (as determined in cycle n+1 in FIG. 3).

This procedure continues through all or through selected memory areas 2 of the data memory.

In a further clock cycle n+3 data "C" of the memory area 2 having the address 0x08000080 is accessed and the assigned trace tag 4 comprising a value of "1" is read out. Since the trace tag 4 of the memory area 2 comprising data "B" is set to "0", the data content, i.e. "B", is discarded during clock cycle n+3 as shown in FIG. 3.

Data "C" and data "D" are captured in clock cycles n+4 and n+5, respectively, as the corresponding trace tags are set to "1".

Each clock cycle may start with rising or with a falling edge/slope. Double slope triggered accesses are also possible. This would increase the data throughput by a factor of two.

Figure 4:
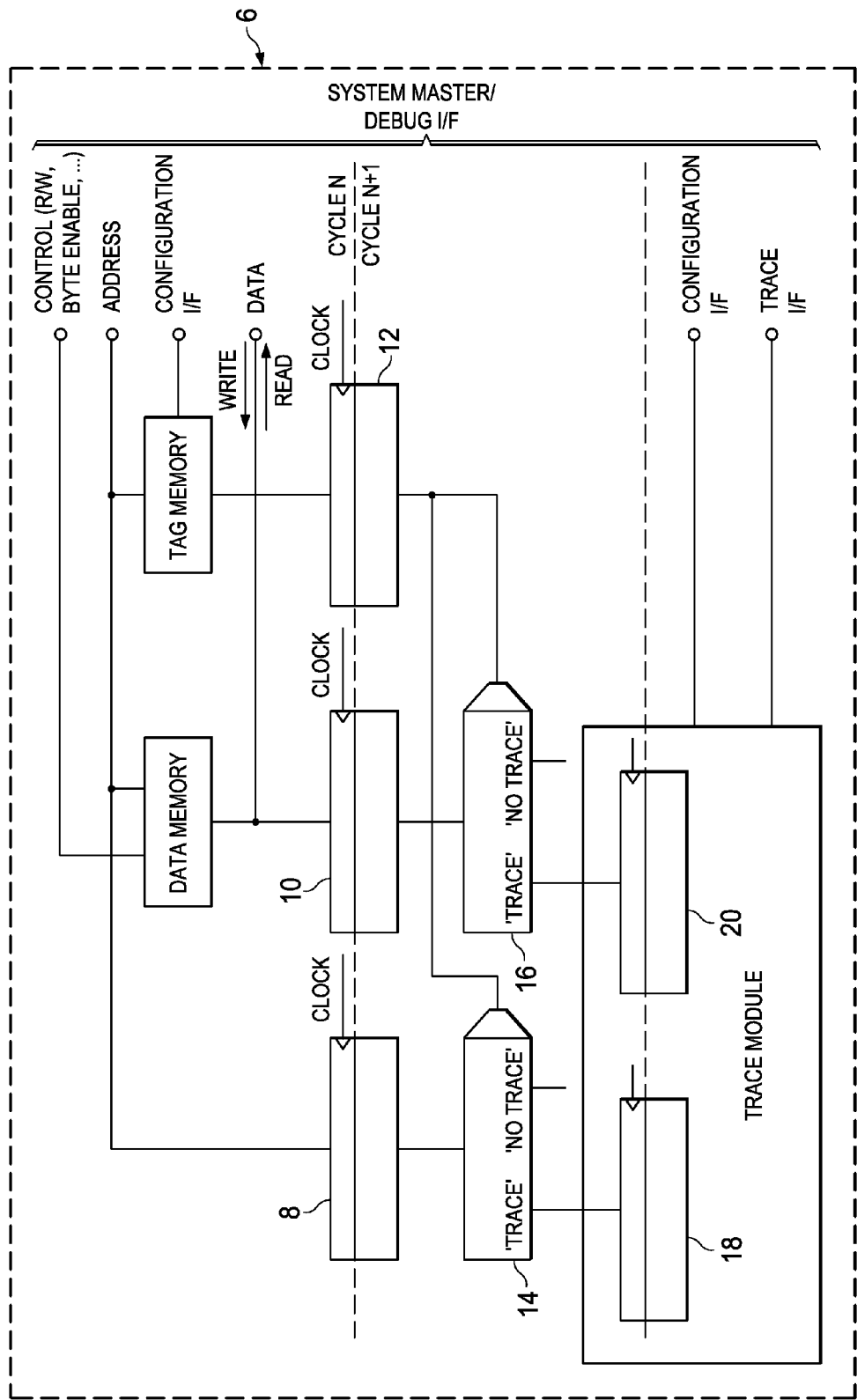

FIG. 4 is a system block diagram of a semiconductor electronic device 6 according to an embodiment of the invention. Preferably, the semiconductor electronic device 6 is a microcontroller. The semiconductor device 6 comprises a memory or data memory that is coupled to a control port receiving read and write information (R/W), bit enable information (bit enable), and further bit information from a system interface of the semiconductor device 6 (system master/debug, I/F). The data memory also receives address information (address). For tracing the memory, the respective memory areas, e.g. 256 bit blocks of the memory are mapped to trace tags 4 of the tag memory (named as such). Single bit trace tags 4 may be used. However a multi bit coded value may be used instead of the single bit value, for example in order to satisfy safety requirements by applying error coding and error correction schemes, etc. The trace selection or configuration is coupled to the trace tag memory via a configuration interface (configuration I/F). For identification of the memory areas 2 that are selected for tracing, the tag memory also receives the respective data block address via the port "address".

During a first clock cycle, address information is stored in a first register 8. Data of the corresponding memory area 2 of the memory is stored in a second register 10. Trace information, i.e. the data of the trace tag 4 that is assigned to the respective memory area 2 is stored in a third register 12. This step is schematically illustrated by "cycle 1" in FIG. 4 at the dashed line separating an upper part of the registers 8, 10, 12 from a lower part thereof.

The address information and the data form the memory area 2 is forwarded to a first and second multiplexer 14 and 16 and further to the registers 18, 20 of the trace module in a second cycle. The semiconductor device 6 is configured to decide whether data and address information is forwarded to the trace module (named as such) or if this information is discarded. This is performed by making use of the information in the trace tag 4 that is temporarily stored in the third register 12. This second cycle is illustrated by "cycle 2" in FIG. 4. The data transfer between the registers 8, 10, 12 to the registers of the trace module via the multiplexers 14 and 16 is illustrated by the two horizontal dashed lines. The connections "trace" and "no trace" of the multiplexers 14, 16 indicate whether data and address information is forwarded to the trace module or in case of "no trace" is discarded. If the trace tag information in the third register 12 indicates that the data is selected for tracing, the respective information (including the address) is forwarded to the trace module. Trace data is transferred via this module to a trace interface (trace I/F). The trace interface may be standard JTAG debug interface or any other kind of high speed interface. Further configuration of the trace module may be performed via the configuration interface (configuration I/F).

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

The invention claimed is:

1. A method for tracing a memory of a semiconductor device, the memory having a plurality of memory areas each comprising a plurality of bits, the semiconductor device further comprising a tag memory comprising a plurality of trace tags, each trace tag comprising at least one bit, method comprising the steps of:
   a) mapping each memory area of the memory to a trace tag that indicates whether or not the respective memory area is selected for tracing,
   b) accessing each memory area of the memory and reading the assigned trace tag and
   c) capturing data of the memory areas when an assigned trace tag indicates that the memory area is selected for tracing, and
   d) discarding data of the memory areas when an assigned trace tag indicates that the memory area is not selected for tracing;
   wherein the step of accessing a respective memory area of the memory and the step of reading the assigned trace tag of the trace memory are performed within a same system clock cycle.

2. The method of claim 1, wherein the step of capturing or discarding data of the respective memory area having a trace tag indicating that the assigned memory area is selected or not selected for tracing is performed in a following or the subsequent system clock cycle with respect to the clock cycle in which the memory area and the assigned trace tag are accessed.

3. A semiconductor device comprising a memory having a plurality of memory areas comprising a plurality of bits and a trace memory having a plurality of trace tags, each comprising at least one bit, wherein each memory area is assigned to a trace tag that indicates whether the respective memory area is selected for tracing or not, the semiconductor device further comprises a trace module for receiving data of memory areas that are selected for tracing;
   further comprising: a first register that is configured for temporarily storing an address of a selected memory area, a second register that is configured for temporarily storing data of the selected memory area and a third register that is configured for temporarily storing data of the trace tag that is assigned to the selected memory area;
   wherein the semiconductor device is further configured to forward the address from the first register to the trace module and to forward data from the second register to the trace module if the trace tag indicates that the respective memory area is selected for tracing;

further comprising a first and a second multiplexer, wherein the first multiplexer is configured receive the address from the first register and the second multiplexer is configured to receive data from the second register, the semiconductor device is further configured to forward the address from the first multiplexer to the trace module and to forward data from the second multiplexer to the trace module, if the trace tag in the third register indicates that the respective memory area is selected for tracing and the semiconductor device is further configured to discard the data for tracing, if the trace tag in the third register indicates that the respective memory area is not selected for tracing.

\* \* \* \* \*